Figure 1:
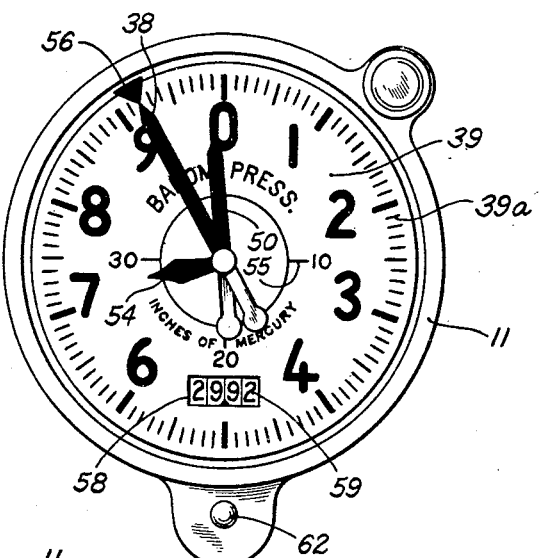

July 27, 1943.　　K. R. SCHWENN　　2,325,282
ANEROID BAROMETER
Filed Dec. 6, 1940

INVENTOR.
Kurt R. Schwenn
BY Cerstvik & Kalman
ATTORNEYS.

Patented July 27, 1943

2,325,282

UNITED STATES PATENT OFFICE 2,325,282

ANEROID BAROMETER

Kurt R. Schwenn, Bloomfield, N. J., assignor to Bendix Aviation Corporation, Bendix, N. J., a corporation of Delaware Application December 6, 1940, Serial No. 368,930

10 Claims. (Cl. 73—4)

This invention relates to indicating instruments, and more particularly to sensitive instruments for indicating the barometric pressure at an airport or station and/or the altitude of an aircraft in terms of barometric pressures.

Indicating instruments such as sensitive altimeters for indicating the altitude of an aircraft during flight are well known in the art, as evidenced by the issued patents to Carbonara, 1,970,544 and Urfer, 2,023,825, for example. However, sensitive altimeters of the above type indicate only the altitude corresponding to the pressure at the particular elevation being flown, without taking into consideration the temperature errors of the air which, at times, may be considerable. In order to overcome this error, temperature compensating means must be provided for the altimeters which bring up the expenditure in time and effort for properly designing such instruments.

An object of the present invention is to provide a novel pressure sensitive instrument for use at airports or weather stations for accurately indicating the barometeric pressure and also for use on aircraft whereby the elevation of the craft above sea level will be indicated in terms of barometric pressures.

Another object is to provide a novel aneroid barometer for use on aircraft whereby the elevation of the craft will be indicated in terms of barometric pressures rather than in terms of altitude in feet or meters.

A further object of the invention is to provide a novel barometric pressure indicator for aircraft and particularly adapted for use thereon during zone flying.

Still another object of the invention is to provide in a novel pressure sensitive instrument of the character above described, a counter mechanism and a marker adapted for setting in unison by means exterior of the instrument case independently of the indicating means which respond to movements of the pressure sensitive elements. The setting of the counter and marker is made to indicate the barometric pressure at the destined airport toward which the craft is flying so that when the craft lands the indicating means and the marker of the instrument coincide.

A further object of the invention is to provide in an indicating instrument, novel means whereby the instrument may be set for a predetermined condition and to indicate such condition upon its being reached and also to indicate the predetermined condition at the time that the instrument is set.

Another and equally important object of the invention is to provide a novel pressure sensitive instrument for aircraft with the use of which a new system of flying and landing is provided in that the craft flying and landing will be accomplished with the use of pressures only.

A still further object of the invention is to provide a pressure system of flying for aircraft by the use of a novel aneroid barometer provided with a marker and pressure indicating means wherein the marker is set for the pressure existing at the airport headed for and the indicating means and marker coincide when the craft arrives at the airport. With the use of the pressure system of flying with the above novel instrument any temperature compensation of altitudes is no longer necessary.

Another object of the invention is to provide a novel pressure sensitive instrument of the above type which during normal craft flying may be used as a level flight indicator.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not designed as a definition of the limits of the invention, reference being had for this purpose to the appended claims.

Figure 2:
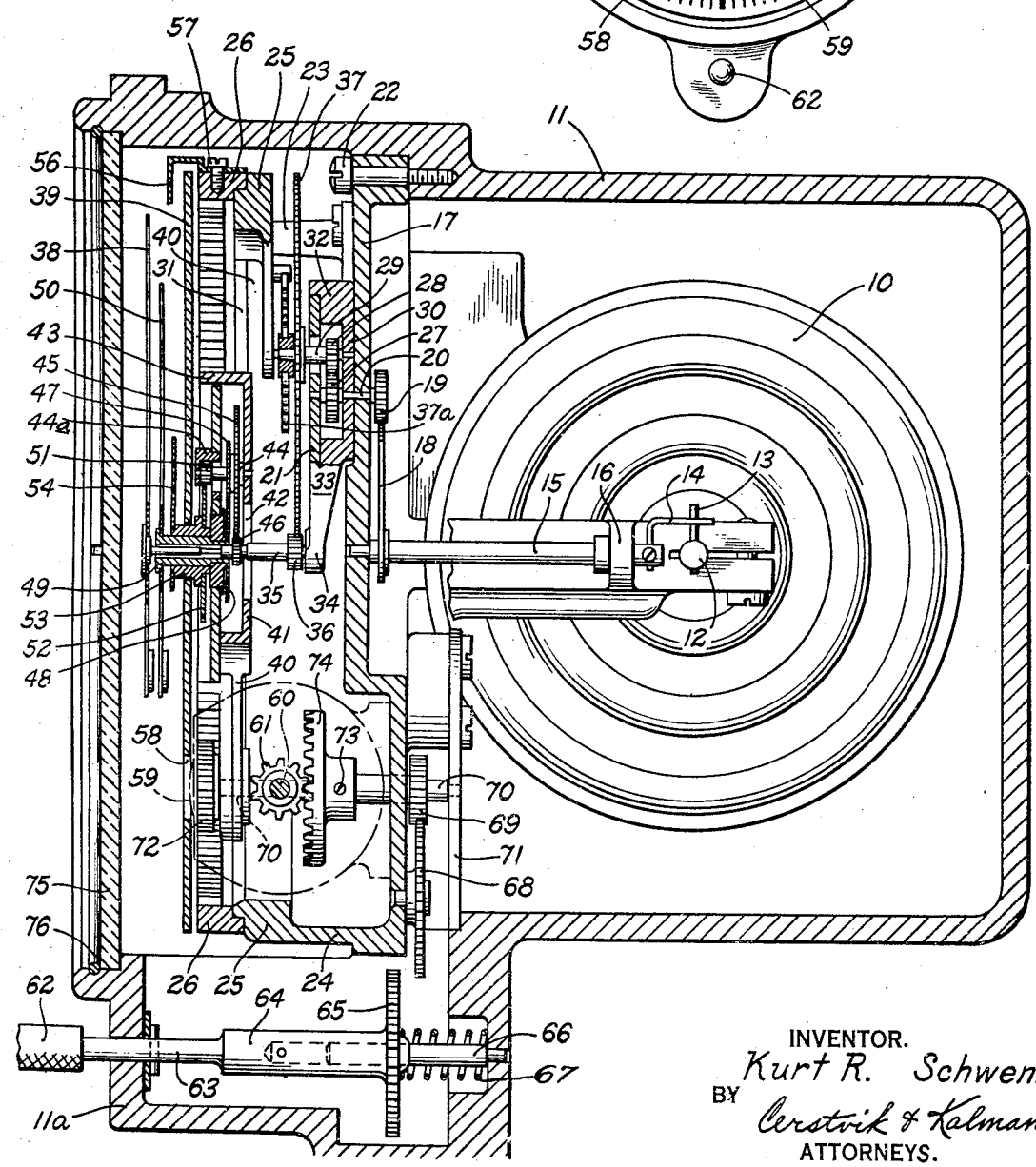

In the drawing, wherein like reference characters refer to like parts throughout the several views, Figure 1 is a front view of an instrument embodying the present invention; and Figure 2 is an enlarged side elevation, in section, of the instrument of Figure 1 incorporating the present invention.

Referring to Figures 1 and 2 of the drawing, the instrument embodying the present invention is shown in the form of an aneroid barometer having an evacuated pressure sensitive element which is adapted to expand and contract upon variation of barometric pressure due to changes in altitude and/or weather conditions, and an amplification mechanism for amplifying the relatively small movements of the pressure sensitive element into readily discernible movements of a plurality of pointers over cooperating scales to indicate the altitude in terms of barometric pressure, the pointers being geared together in such a manner that one moves only a fraction of a revolution for one complete revolution of the other, the latter indicating the atmospheric pressure in fractions of inches of mercury and the former in unit inches of mercury. As shown in the drawing, the indication may be made by three pointers, the longest pointer making one revolution for each inch of change, thus measuring decimal parts of each inch; the second pointer revolving once for each 10″ of change; and the shortest pointer operating over a secondary scale which may read from 0 to 30″ of mercury. Although but one range of movement has been shown, the aneroid barometer can be made to respond to several ranges.

In the form shown, the pressure sensitive element comprises one or more aneroid capsules 10 (only one being shown) mounted upon a suitable support (not shown) within the housing or casing 11. Means are provided for employing and amplifying the movement of the aneroid capsules upon actuation thereof due to changes in atmospheric pressure and comprise a bracket or supporting element 12 mounted on the aneroid 10 for reciprocal movement therewith and carrying a link or pin 13 which engages a finger 14 fastened to a rock-shaft 15 suitably journalled in a supporting member 16 and a plate 17. By engagement of finger 14 with pin 13 reciprocal movement of the aneroid is translated into angular movement of rock-shaft 15.

The rock-shaft 15 has secured thereto or formed integrally therewith a gear sector 18 which is arranged to mesh with a pinion 19 carried by a countershaft 20 journalled in the plate 17 and in another plate 21. Plate 17 is suitably secured to the interior of the casing by means such as a screw 22 and is provided at its outer ends with extending flanges or arms 23 and 24 carrying a bearing surface 25 adapted to rotatably mount an internally toothed ring member 26 whose purpose will presently appear.

The countershaft 20 is provided with a second pinion 27 meshing with a further pinion 28 suitably mounted upon a driven shaft 29 journalled at one of its ends in a plate 30 and at its other end in a plate 31, the latter plate constituting an extension of bearing member 25 carried by plate 17. Plate 21 is joined with plate 30 by way of a wall 32 so as to define a chamber within which pinion 27 meshes with pinion 28 and the plates are further provided with an extending arm 33 defining a journalled support 34 for one end of a shaft 35, provided with a small pinion gear 36 thereon. A large gear 37 suitably mounted upon the driven shaft 29 meshes with the pinion 36.

The expanding and contracting motion of aneroid 10 is therefore transferred to shaft 35 in a greatly amplified form by way of pin 13, finger 14, rock-shaft 15, gear sector 18, pinions 19, 27, 28 and gears 37 and 36.

Secured to the free end of shaft 35 is a large pointer 38 which, by way of the aforesaid gear train is caused to make, for example, one complete revolution about a suitable dial 39 for each inch change in atmospheric pressure, thereby permitting decimal reading of the pressure change upon dial 39 which is provided with a scale 39a suitably calibrated in the manner better shown in Figure 1.

Arms 40 carried by the bearing surface member 25 support a plate 41 provided with an aperture 42 for receiving shaft 35 and further provided with a circular wall 43 surrounding the gear train now to be described.

A shaft 44 journalled at one of its ends in plate 41 and at its other end in a stationary plate 44a rigid with plate 41 carries a relatively large gear 45 which meshes with a pinion 46 mounted on shaft 35, the pinion 46 receiving its motion from aneroid 10 through large gear 37 to rotate gear 45 and shaft 44. Rotation of shaft 44 rotates a smaller gear 47 mounted thereon which meshes with and rotates a gear 48 mounted on a hollow shaft 49 surrounding shaft 35. Hollow shaft 49 is provided with a pointer 50 at its free end for rotation over dial 39. The gearing system just described may be designed so as to move pointer 50, cooperating with scale 39a, one complete revolution over dial 39 for each 10″ of atmospheric pressure change.

Also mounted upon shaft 44 is a smaller pinion 51 adapted to mesh with a gear 52 secured to a second hollow shaft 53 which surrounds and is concentric with hollow shaft 49. Mounted on the free end of hollow shaft 53 is a small pointer 54 which is likewise superimposed for movement over dial 39 and cooperates with a secondary scale 55 which reads from 0 to 30″ of mercury as shown in Figure 1.

With each change in barometric pressure, therefore, the aneroid 10 is actuated and its motion transmitted to and amplified by gear 37 which in turn imparts motion to shafts 35, 49 and 53 and pointers 38, 50 and 54, respectively. A suitably mounted coil spring 37a is provided for constraining driven shaft 29 thereby overcoming undesirable oscillations thereof due to external forces or accelerations.

With the above described amplification factor therefore, referring to Figure 1 of the drawing, the short pointer 54 cooperating with the secondary scale 55 and falling between the designations 20 and 30 indicates the first number of the reading to be "2." The middle pointer 50 resting between the designations 9 and 0 of scale 30a indicates that the second number of the reading is "9" while the long pointer 38, resting two divisions away from the designation 9 indicates that the last two digits of the reading are .92. Therefore pointers 38, 50 and 54 indicate the instant barometric pressure reading to be 29.92 inches of mercury. Since the scale 39a is marked off into 100 spaces and, in practice, each space is approximately one-tenth of an inch wide, readings can be readily made up to 0.002.

The above described barometer may be designed for several ranges, for example, it may be made to operate over a range of 10″ of mercury. If the unit is to be used at one altitude only it can be calibrated very accurately over a 3″ range, sufficient to cover the minimum and maximum pressures at that point. The range may be increased to 24″ of mercury which would correspond to a range of 7″ to 31″ or to altitudes from below sea level to about 35,000 feet altitude.

In accordance with the present invention means are now provided for setting the instrument for a predetermined barometric pressure, and for this purpose the internally toothed ring member 26 is mounted for rotation upon the bearing surface 25 behind the dial 39 and has secured thereto a triangular marker or index 56 by suitable means such as a screw 57. The marker 56 projects over dial 39 and cooperates with scale 39a.

The dial 39 is provided with a rectangular slot 58 to present to view a counter mechanism 59 reading inches of mercury (shown in phantom in Figure 2). The counter 59 is properly designed and provided with a plurality of rotatable drums carrying numerals thereon for viewing through slot 58, the drums being differentially connected and suitably mounted upon a shaft 60 having secured thereto a pinion 61.

A knob 62, accessible from the exterior of the instrument case, is provided for setting the counter 59 and marker 56 in unison so that the reading on scale 39a by marker 56 at all times coincides with the counter reading. For this purpose knob 62 is rigidly fastened to a shaft 63 journalled for sliding movement and rotation in an extension 11a of case 11 and has an enlarged hollow portion 64 carrying a gear 65 at the free end thereof, the hollow portion 64 slidably receiving therein a shaft 66 suitably journalled in a wall of case extension 11a defining a guide member for longitudinal sliding of shaft 63. A coil spring 67 is provided about shaft 66 and normally urges shaft 63 outwardly. During a setting, knob 62 is urged inwardly against the action of spring 67 until gear 65 thereof meshes with a gear 68 journalled in a portion of plate 17, which in turn meshes with a gear 69 suitably fastened to a shaft 70 journalled at one end in a plate 71 and carrying at its other end a gear 72 meshing with the internally toothed portion of ring member 26.

Mounted upon shaft 70 by suitable means such as a pin 73 is a crown gear 74 adapted to mesh with pinion 61 of counter mechanism shaft 60 and to rotate the latter pinion during rotation of shaft 70. Rotatable movement of knob 62, therefore, when gears 65 and 68 are in mesh, causes rotation of shaft 60 of the counter through crown gear 74 and pinion 61 and likewise simultaneous rotation of marker 56 over dial 39 by way of shaft 70, gear 72 and ring member 26. The counter 59 may be set at will to any desired reading and at all times the marker 56 will designate the last two digits of the reading as shown, for example, in Figure 1 of the drawing which represents the decimal part of the pressure change. It is also to be noted that the marker 56 and counter 59 are set together independently of the barometer proper and its indicating means so that only the absolute atmospheric pressure is indicated at all times by the barometer indicating means.

The open end of casing 11 is provided with a suitable transparent window 75 suitably held in place by means of a split-ring 76.

In operation, changes in atmospheric pressure at an airport or station due to weather conditions, or the various atmospheric pressures traversed by an aircraft carrying the present instrument, will be indicated by pointers 38, 50 and 54 in terms of pressure in inches of mercury. By manually operating knob 62 to set the marker 56 to a pressure desired to be maintained in flight, the instrument can be used as a level flight indicator by maintaining pointer 38 in coincidence with marker 56.

For proper control of the landing of aircraft at an airport, one instrument of the present type is located on the ground at the landing field, and another one is carried on the aircraft.

When it is desired to land at the airport, the barometric pressure of which has been received on the aircraft by radio, the marker 56 is set to that pressure as an index to time the craft landing. The pressures indicated during flight will naturally differ from that set for at the landing field, but once the craft is about to land pointer 38 will substantially coincide with marker 56 thereby indicating the airport pressure to have been reached.

With the use of the present novel device, the pilot is provided with indications of pressure rather than altitudes, particularly adaptable for zone flying, in that the possibility of collisions in the air is eliminated which necessarily results with the reading of altitudes since altimeters indicate only the altitude corresponding to the pressure at certain elevations without taking into consideration the temperature error of the air. The present device, furthermore, institutes a new system of flying and landing; namely, a pressure system. Use of the pressure system of flying obviates the necessity of temperature compensation for altitudes and it will be further possible to provide the pilot with information from mountain tops and other dangerous places of the pressure existing there, and all that need be done is to keep the craft at a pressure reading above the given mark.

Although only one embodiment of the invention has been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the invention reference will be had primarily to the appended claims.

What is claimed is:

1. In an indicating instrument, means actuated in response to changes in barometric pressure, scale means calibrated in terms of barometric pressure, indicating means operated by said pressure actuated means and superimposed for movement over said scale means for indicating said barometric pressure on said scale means, reference means, means for setting said reference means relative to said scale means and said indicating means for a predetermined barometric pressure, means for presenting to view said predetermined set barometric pressure in numerals, and means interconnecting said reference means and said numeral presenting means whereby said setting means is adapted to set in unison the two latter means independently of said first-named indicating means and said scale means, said first-named indicating means coinciding with said reference means when said predetermined barometric pressure has been attained.

2. In an aneroid barometer, means actuated in response to changes in barometric pressure, a scale calibrated in terms of barometric pressure, indicating means operated by said pressure actuated means and superimposed for movement over said scale for indicating said barometric pressure on said scale, reference means, means for setting said reference means relative to said scale and said indicating means for a predetermined barometric pressure, means for indicating said predetermined set barometric pressure in numerals, and means interconnecting said reference means and said numeral indicating means whereby said setting means is adapted to set in unison the two latter means independently of said first-named indicating means and said scale.

3. In an indicating instrument, means actuated in response to changes in barometric pressure, scale means calibrated in terms of barometric pressure, indicating means operated by said pressure actuated means and superimposed for movement over said scale means for indicating said barometric pressure on said scale means, reference means, means for setting said reference means relative to said scale means and said indicating means for a predetermined barometric pressure, means for presenting to view said predetermined set barometric pressure in numerals, and a gear train interconnecting said reference means and said numeral presenting means, said setting means being adapted to operate said gear train to thereby set in unison the reference means and the numeral presenting means independently of said first-named indicating means and said scale means.

4. In an aneroid barometer, means actuated in response to changes in barometric pressure, scale means calibrated in terms of barometric pressure, indicating means superimposed for movement over said scale means, a gear train responding to said pressure actuated means for operating said indicating means to indicate said barometric pressure on said scale means, marker means, means for setting said marker means relative to said scale means and said indicating means for a predetermined barometric pressure, means for indicating said predetermined set barometric pressure in numerals, and a second gear train separate and distinct from said first gear train interconnecting said marker means and said numeral indicating means, said setting means being adapted to operate said second gear train for setting in unison the marker means and the numeral indicating means independently of said scale means and said first-named indicating means.

5. An aneroid barometer instrument having a casing provided with an open end, means within said casing actuated in response to changes in barometric pressure, a dial graduated in terms of barometric pressure rigidly mounted at the open end of said casing for viewing from the exterior of said casing, indicating means superimposed for movement over said dial to indicate barometric pressure in inches, tenths of an inch, and hundredths of an inch of mercury, a first gear train connected to said pressure actuated means and operated thereby for moving said indicating means to indicate said barometric pressure, internally toothed means mounted for rotation adjacent said dial, an index mounted on said last-named means for movement about the outer periphery of said dial for indicating barometric pressures independently of said indicating means, means for presenting to view in numerals the corresponding barometric pressures indicated by said index, and means including a second gear train separate and distinct from said first gear train for engaging said internally toothed means for setting said index and said numeral presenting means in unison independently of said dial and said first-named indicating means for a predetermined barometric pressure other than that indicated by said indicating means, one portion of said indicating means coinciding with said index when said predetermined barometric pressure has been attained.

6. An aneroid barometer comprising a relatively stationary dial having scale means calibrated in units of barometric pressure, a plurality of intergeared pointers cooperating with said scale means to indicate barometric pressure in inches, tenths of an inch and hundredths of an inch of mercury, aneroid means responsive to changes in barometric pressure and connected to actuate said pointers over said dial, a settable reference marker rotatable about the periphery of said dial and cooperating with said scale means and arranged to coincide with one of said pointers at a predetermined barometric pressure, manually operated setting means for setting said marker independently of said pointers and said dial for a predetermined barometric pressure, whereby said marker and said one pointer coincide when said predetermined barometric pressure occurs or is reached, and reference indicating means calibrated in the same units of barometric pressure as said scale means and connected to be actuated by said manually operated setting means simultaneously with said reference marker and independently of said pointers and said dial, for indicating the barometric pressure for which said marker has been set.

7. An aneroid barometer comprising a dial having scale means calibrated in units of barometric pressure, pointer means cooperating with said scale means to indicate barometric pressure in inches, tenths of an inch and hundredths of an inch of mercury, aneroid means responsive to changes in barometric pressure and connected to actuate said pointer means over said dial, rotatable and settable reference marker means also cooperating with said scale means and with said pointer means, manually operated setting means for setting said marker means on said scale means for a predetermined barometric pressure independently of said pointer means and said dial, whereby a coincident indication is produced by said marker means and one portion of said pointer means when said predetermined barometric pressure occurs or is reached, and reference indicating means calibrated in the same units of barometric pressure as said scale means and connected to be actuated by said manually operated setting means simultaneously with said reference marker means and independently of said pointer means and said dial, for indicating the barometric pressure for which said marker means have been set.

8. An aneroid barometer comprising a dial having scale means calibrated in units of barometric pressure, pointer means cooperating with said scale means to indicate barometric pressure in inches, tenths of an inch and hundredths of an inch of mercury, aneroid means responsive to changes in barometric pressure and connected to actuate said pointer means over said dial, rotatable and settable reference marker means also cooperating with said scale means and with said pointer means, manually operated setting means for setting said marker means on said scale means for a predetermined barometric pressure independently of said pointer means and said dial, whereby a coincident indication is produced by said marker means and one portion of said pointer means when said predetermined barometric pressure occurs or is reached, and reference indicating means calibrated in the same units of barometric pressure as said scale means and connected to be actuated by said manually operated setting means simultaneously with said reference marker means and independently of said pointer means and said dial, for indicating the barometric pressure for which said marker means have been set, said reference indicating means comprising a counter including a plurality of interconnected numeral elements each provided with a set of numerals and movable to select for exhibition a single numeral from each set, said selected numerals constituting a figure representing the barometric pressure for which the marker means are set.

9. An aneroid barometer comprising a relatively stationary dial having scale means calibrated in units of barometric pressure, a plurality of intergeared pointers cooperating with said scale means to indicate barometric pressure in inches, tenths of an inch and hundredths of an inch of mercury, aneroid means responsive to changes in barometric pressure and connected to actuate said pointers over said dial, a settable reference marker rotatable about the periphery of said dial and cooperating with said scale means and arranged to coincide with one of said pointers at a predetermined barometric pressure, manually operated setting means for setting said marker independently of said pointers for a predetermined barometric pressure, whereby said marker and said one pointer coincide when said predetermined barometric pressure occurs or is reached, and reference indicating means calibrated in the same units of barometric pressure as said scale means and connected to be actuated by said manually operated setting means simultaneously with said reference marker and independently of said pointers, for indicating the barometric pressure for which said marker has been set, said reference indicating means comprising a counter including a plurality of numeral wheels arranged in juxtaposition, each wheel having a set of numerals and being rotatable in either direction to select for exhibition a single numeral from each set, said selected numerals constituting a figure representing in inches, tenths of an inch and hundredths of an inch of mercury the barometric pressure for which said reference marker is set.

10. In an indicating instrument, means actuated in response to changes in barometric pressure, a dial, a plurality of pointers operated by said pressure actuated means for indicating the value of said barometric pressure on said dial, an index marker, means for setting said marker for a predetermined barometric pressure, a counter presenting to view the value of said predetermined set pressure in numerals, and a connection between said marker and said counter whereby said setting means is adapted to set in unison the marker and counter relative to said dial and pointers, one of said pointers coinciding with said marker when said predetermined pressure has been attained.

KURT R. SCHWENN.